United States Patent [19]

Albats

[11] Patent Number: 5,160,844
[45] Date of Patent: Nov. 3, 1992

[54] GAIN STABILIZED NEUTRON DETECTOR

[75] Inventor: Paul Albats, Ridgefield, Conn.

[73] Assignee: Schlumberger Technology Corporation, New York, N.Y.

[21] Appl. No.: 602,525

[22] Filed: Oct. 24, 1990

[51] Int. Cl.$^5$ .............................................. G01T 3/00
[52] U.S. Cl. ............................... 250/390.07; 250/374; 250/390.01
[58] Field of Search .................... 250/390.01, 390.07, 250/262, 269, 252.1, 261, 374, 253

[56] References Cited

U.S. PATENT DOCUMENTS

| | | |
|---|---|---|
| 3,515,878 | 6/1970 | Ried et al. |
| 3,521,063 | 7/1970 | Tittman |
| 3,800,143 | 3/1974 | Fishman et al. |
| 3,900,731 | 8/1976 | Chevalier et al. |
| 3,922,541 | 11/1975 | Seeman |
| 4,272,677 | 6/1981 | Berthold et al. .................. 250/252.1 |
| 4,296,320 | 10/1981 | Miller |
| 4,476,391 | 3/1982 | Bednarczyk |
| 4,760,252 | 7/1988 | Albats et al. ........................ 250/269 |
| 4,785,175 | 11/1988 | Wormald et al. ................ 250/253 X |
| 4,884,288 | 11/1989 | Sowerby ..................... 250/390.05 X |
| 4,918,314 | 4/1990 | Sonne .................................. 250/369 |

*Primary Examiner*—Constantine Hannaher
*Assistant Examiner*—Edward J. Glick
*Attorney, Agent, or Firm*—Leonard W. Pojunas

[57] ABSTRACT

A nuclear detector and a circuit connect in a feed back loop to stabilize gain. The circuit defines two intervals about the capture reaction peak of a pulse height spectrum of neutron counts made by the detector and determines the number of counts occurring within the two intervals. The circuit connects to a high voltage source that powers the detector and adjusts the voltage to compensate for any shift of the pulse height spectrum due to electronic drift, for example. The circuit comprises discriminator circuits, a microprocessor, or a digital processor, for example.

18 Claims, 3 Drawing Sheets

GAIN STABILIZED NEUTRON DETECTOR

FIELD OF THE INVENTION

The invention concerns an apparatus for counting neutrons. More specifically, the invention concerns a neutron detector and a circuit connected in a feedback loop for stabilizing gain.

BACKGROUND OF THE INVENTION

Sondes having neutron sources and neutron detectors are commonly used in well logging. The sonde is lowered on the end of a cable into a borehole of a formation and then is slowly winched toward the surface as measurements are made. the neutron source of the sonde generates neutrons through the components of the formation being logged. The neutrons collide with nuclei of the components of the formation in an elastic collision. The neutron detector of the sonde senses the neutrons that ricochet through the formation and back to the sonde. A record of the detected neutrons, a neutron log, is used in interpreting the porosity in combination with the density, lithology and gas of the formation.

Neutron detectors for well logging typically comprise a metal housing that contains $^3$He gas. Neutrons that reach the detector collide with atoms of the $^3$He gas. This collision usually produces a proton and a triton at the low neutron detection energies of neutron well-logging. At higher neutron energies, direct collisions with $^3$He nuclei are more likely. A biased conductor surrounded by the $^3$He gas within the housing is affected by the charge that results upon the release of the proton and the triton or upon the direct collisions. This produces an electrical pulse that travels through the conductor. The neutron detector counts each such pulse as an indication of the presence of a neutron. However, such electrical pulses have amplitudes that differ from one another and which determine a pulse height spectrum. The amplitude of each electrical pulse depends on the location and orientation of the associated particles when the collision occurs, for example.

Neutron detectors are also responsive to gamma radiation that occurs naturally in the formation being logged or is generated due to reactions of neutrons with the nuclei of the formation, borehole, or sonde. Gamma radiation can free electrons from the housing, which also produces ions in the $^3$He gas. The biased conductor within the housing is also affected by charges that result upon the release of the electrons and the ions. Each charge produces an electrical pulse that travels through the conductor. The neutron detector could falsely count each such pulse as an indication of the presence of a neutron. Because a neutron detector is responsive, not only to neutrons, but also to gamma radiation, such a neutron detector would indicate an inaccurate neutron count.

U.S. Pat. No. 4,476,391 to Bednarczyk for "Method for Improving Accuracy in a Neutron Detector" ("the Bednarczyk patent") concerns an approach for distinguishing between counts caused by neutrons and gamma radiation. This approach involves the setting of a predetermined amplitude threshold level. All counts that occur below this threshold level are removed from a total count by the neutron detector and are considered to be the result of gamma radiation. All counts that occur above this threshold level are included in the total count by the neutron detector and are considered to be the result of neutron collisions. However, this approach is open loop and is affected by many conditions. For example, temperature will affect the detector such that the threshold level and the bias of the conductor can drift independently. Thus, repeated neutron logs of the same formation could be inconsistent.

FIG. 1 is a schematic diagram of a prior art neutron detector 10 having a circuit that distinguishes between actual neutron counts and gamma radiation counts. The neutron detector 10 and circuit connect in an open loop. The neutron detector 10 contains $^3$He gas and is responsive to neutrons occurring in the formation. As described in the background of the invention, the neutron detector 10 is also responsive to electrons that have been freed by gamma radiation. A high voltage source 12 produces a set voltage level that biases a conductor (not shown) within the neutron detector 10. The neutrons and gamma rays produce pulses on the conductor, as described above. A resistor 14 blocks the pulses from reaching the high voltage source 12. A capacitor 16 blocks the voltage of the high voltage source 12 from reaching an amplifier 18.

The amplifier amplifies the input signal comprising the pulses from the conductor and produces an output signal, as described below concerning FIG. 2. A discriminator 20 sets a predetermined threshold level. Pulses having an amplitude above the threshold level are very likely produced by a neutron. Thus, pulses having an amplitude above the threshold level are counted as part of the neutron detector count rate. Pulses having an amplitude below the threshold level are very likely produced by noise or an electron that has been freed by a gamma ray, for instance. Thus, pulses having an amplitude below the threshold level are not counted as part of the neutron detector count rate.

FIG. 2 is a graph that illustrates a pulse height spectrum 22 of a $^3$He neutron detector, which is the output signal of the amplifier of FIG. 1. The number of pulses produced by the neutron detector 10 are plotted as counts on the abscissa. The amplitude of the pulses produced by the neutron detector 10 are plotted as channel numbers on the ordinate. The channel numbers are directly proportional to amplitude of the pulses. The large capture reaction peak of the signal represents those pulses caused by neutrons. The energy released is 0.76 MeV and is due to a capture reaction:

$$n + {}^3He \rightarrow p + t$$

where n is the neutron, p is a proton, and t is a triton. This energy represents the binding energy of 2 protons and 1 neutron of $^3$He compared to the binding energy of 1 proton and 2 neutrons in a triton.

The second peak 24 is an artificial peak of the signal that represents noise and those pulses caused by electrons that have been freed by gamma radiation. The discriminator level is typically set to coincide with a minimum 26 in the pulse height spectrum, below which pulses caused by gamma radiation and noise occur, and above which pulses caused by neutrons occur.

The open loop system of FIG. 1 is affected by many conditions. For example, temperature will affect the detector 10 such that the threshold level and the bias of the conductor can drift, causing neutron logs of the formation to be very inaccurate. For example, if the voltage of the high voltage source 12 increases due to a reduction in load or a decrease in ambient temperature, the output of the amplifier 18 would change such that the pulse heights would appear to be larger for all of the counts made by the neutron detector 10. As a result, the spectrum of FIG. 2 would shift to the right. Given a stable discriminator level, the nuclear detector 10 would count a different portion of the pulse height spectrum 22.

Furthermore, the discriminator level could vary independently. For example, an increase in ambient temperature could cause the discriminator 20 to produce a higher threshold voltage level. As a result the discriminator level of FIG. 2 shifts to the right. The neutron detector 10 would count less of the FIG. 2 pulse height spectrum 22.

U.S. Pat. No. 3,922,541 to Seeman ("the Seeman patent") describes a method and apparatus for stabilizing the gain of a radiation detector. However, as described below, the method and apparatus of the Seeman patent are not directly applicable to the present invention.

According to the Seeman patent, a processing circuit outputs a spectrum of pulses to an amplifier that applies the pulses to three comparators, each having a reference amplitude. One amplitude corresponds to the summit of a reference peak. Two other amplitudes correspond to points at edges of the reference peak. The outputs of the three comparators connect through other circuitry to a high voltage power supply control unit. This unit sends a signal to adjust the high voltage of a voltage supply and thus the gain of the detector. The apparatus of the Seeman patent uses a gamma ray source, such as Cesium-137 to produce the reference peak. This reference peak, as the Seeman patent describes, is outside the spectrum of the pulses from the amplifier.

FIG. 3 is a graph illustrating the spectrum of pulses detected by a gamma counter, such as that of the Seeman patent. The abscissa plots energy level in electron volts and the ordinate plots the number of gamma ray counts. A first curve 28 indicates that most gamma ray counts occur in the 200 ke V range, and are negligible in the 500 ke V range. A second curve 30 indicates the counts produced by a source such as Cesium-137, which corresponds to the reference peak of the Seeman patent. These counts group closely at 660 ke V, well outside the spectrum of gamma ray counts 28 that occur in the formation. Because counts caused by the source are clustered in a stable grouping well outside the spectrum of gamma ray counts 28, the second curve 30 is chosen as a reference curve. Any shift in the spectrum is compared to the reference second curve 30.

The generation of a reference curve at an energy level significantly less than the 660 ke V level would coincide with and thus interfere with the counts represented by the first curve 28, and would provide an inaccurate count of gamma radiation. Therefore, the reference peak of the Seeman patent is deliberately set well outside the gamma pulse spectrum 28 to minimize interference with that spectrum.

The reference peak of the Seeman patent is deliberately set well outside the gamma pulse spectrum for another reason. Gamma radiation spectrums change shape because the amount of radiation that is sensed by the gamma detector is dependent on the environment of the detector. The composition of the formation surrounding the gamma detector drastically affects the levels of gamma radiation that pass through the formation to the detector and, thus, the gamma radiation spectrum. A third curve 32 is an example of another gamma radiation spectrum. It is the very difference between gamma radiation spectrums, such as 28, 32, that, when interpreted, indicates the composition of the formation. Because the gamma radiation spectrum 28, 32 depends on the composition of the formation and therefore changes shape, the reference peak 30 is set at 660 ke V, well outside any the range of any expected spectrum, so that the reference peak 30 does not coincide or interfere with the gamma radiation counts 28,32.

FIGS. 2A and 2B illustrate that a narrower high voltage operating plateau can result when high pressure detectors are used for epithermal detection, for example. FIG. 2A plots the normalized counts of the pulse height spectrum of a neutron detector. FIG. 2B plots normalized counts of a neutron detector as a function of voltage applied to that detector. A first curve 35A illustrates the counts of a low pressure neutron detector at 10 Atm, for example. The curve has a relatively long plateau 34A. Thus, a drift in voltage that occurs between voltage values C and D is within the plateau and the normalized output of the neutron detector changes negligibly. A second curve 35B illustrates the counts of a high pressure neutron detector at 40 Atm, for example. The curve has a relatively narrow plateau 34B. Thus, a drift in voltage that occurs between voltage values C and D is outside the plateau and the normalized output of the neutron detector can change drastically. Narrow high voltage operating plateaus also result when neutron detectors have short time constants for charge collection or when the geometry of the detector is less than a 3/1 ratio of length to diameter, for example.

High pressure detectors are also more sensitive to gamma radiation, which can cause the gamma radiation counts to increase to the line 36. The plateau 34B of FIG. 2B narrows as the gamma radiation counts encroach upon those made by neutrons, which are represented by the capture reaction peak.

Operating a neutron detection system under narrow plateau conditions has been unsatisfactory, because such a system is more sensitive to changes in the voltage level of the high voltage or the discriminator threshold voltage. A drift in the discriminator level under narrow plateau operating conditions would either incorrectly count gamma radiation as neutron counts if the discriminator level shifts to the left, or incorrectly exclude neutron counts if the discriminator level shifts to the right. Similarly, a drift in the high voltage level would either incorrectly exclude neutron counts if the high voltage level shifts the reference peak to the left, or would incorrectly count gamma radiation as neutron counts if the high voltage level shifts the reference peak to the right. Conversely, a system operating under longer plateau conditions would permit a larger margin of drift of the high voltage level and the discriminator level.

However, according to the present invention, the pulse height spectrum of a neutron detector is held constant relative to the discriminator level. Thus, operating a neutron detector under narrow plateau conditions is not critical to the accuracy of the detector.

SUMMARY AND OBJECTS OF THE INVENTION

The invention concerns an apparatus having a neutron detector and a circuit connected in a feedback loop to the detector for stabilizing the gain of the apparatus.

In one embodiment of the invention, the circuit comprises two discriminators that determine windows around a capture reaction peak occurring in a pulse height spectrum. The two discriminators produce output signals to a stabilizer circuit that regulates the output of a high voltage source connected to the neutron detector.

It is one object of the invention to provide a neutron detector that is gain stabilized. It is another object to provide a neutron detector that disregards counts caused by gamma radiation. It is another object of the invention to provide a neutron detector that does not require a secondary neutron source, such as Cs-137. It is at least another object to provide a neutron detector that has a high count rate capability compared to detectors of the prior art.

DETAILED DESCRIPTION

Figure 1:
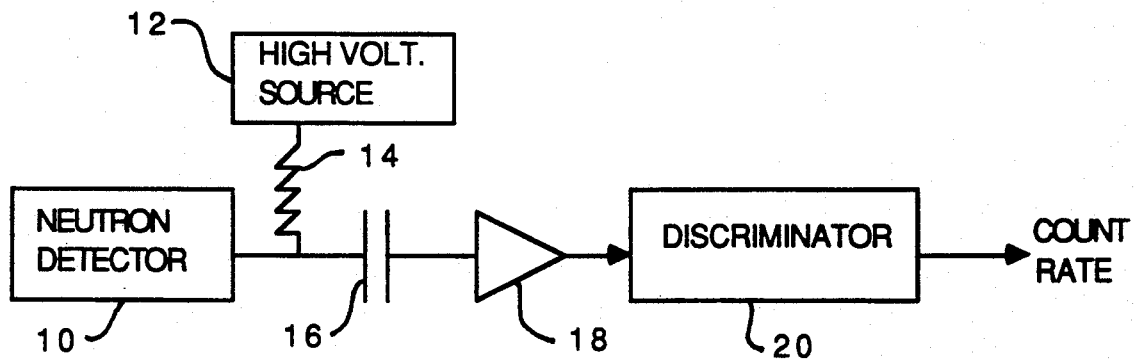
FIG. 1 is a schematic diagram of a prior art neutron detector having a circuit that distinguishes between actual neutron counts and counts caused by gamma radiation.
Figure 2A:
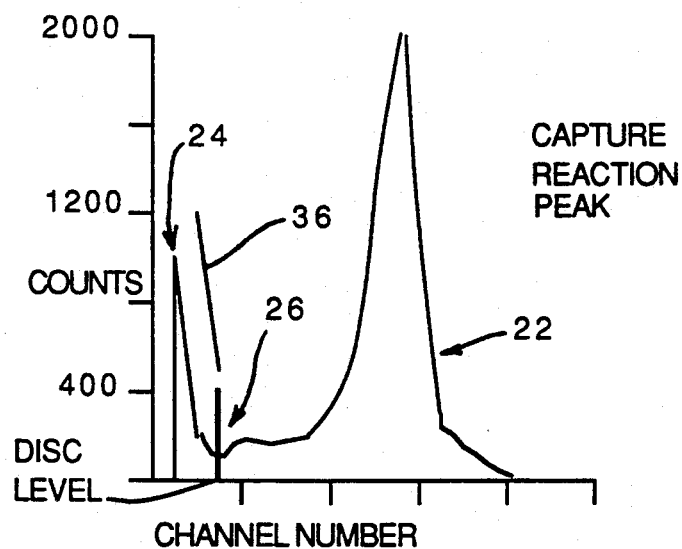
FIG. 2A and 2B illustrate a pulse height spectrum and high voltage operating plateau of a prior art $^3$He neutron detector.
Figure 2B:
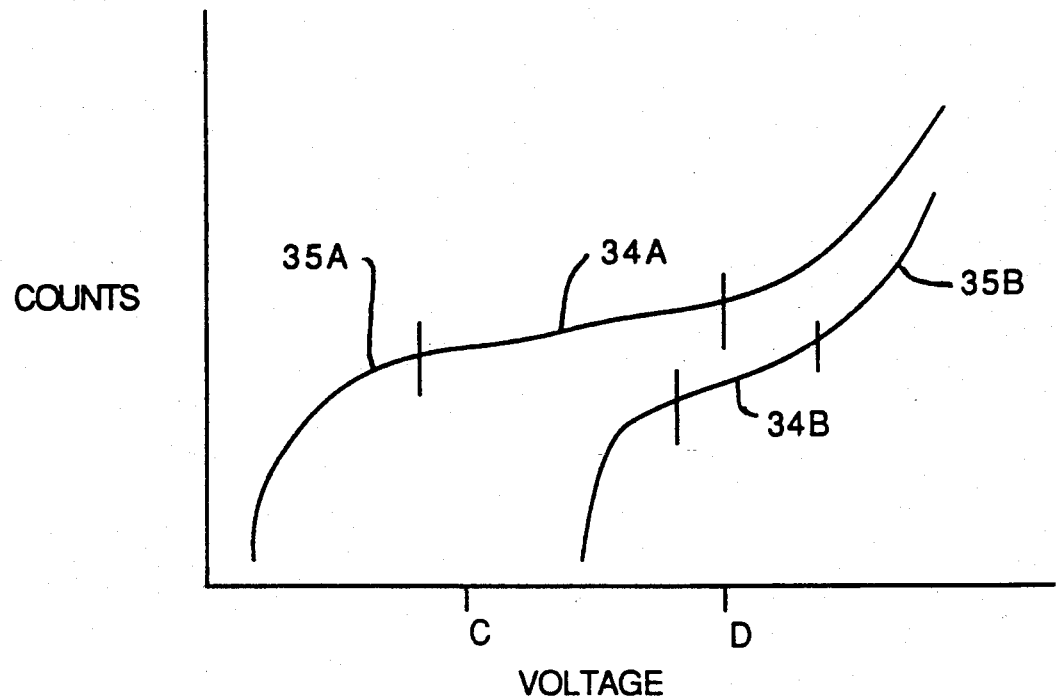
Figure 3:
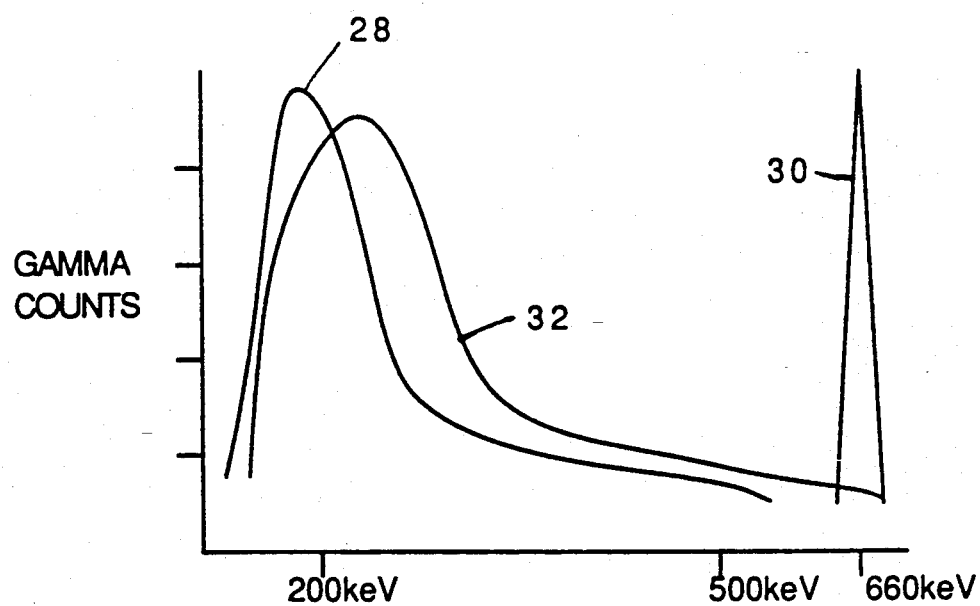
FIG. 3 illustrates a pulse height spectrum of a prior art gamma detector.
Figure 4:
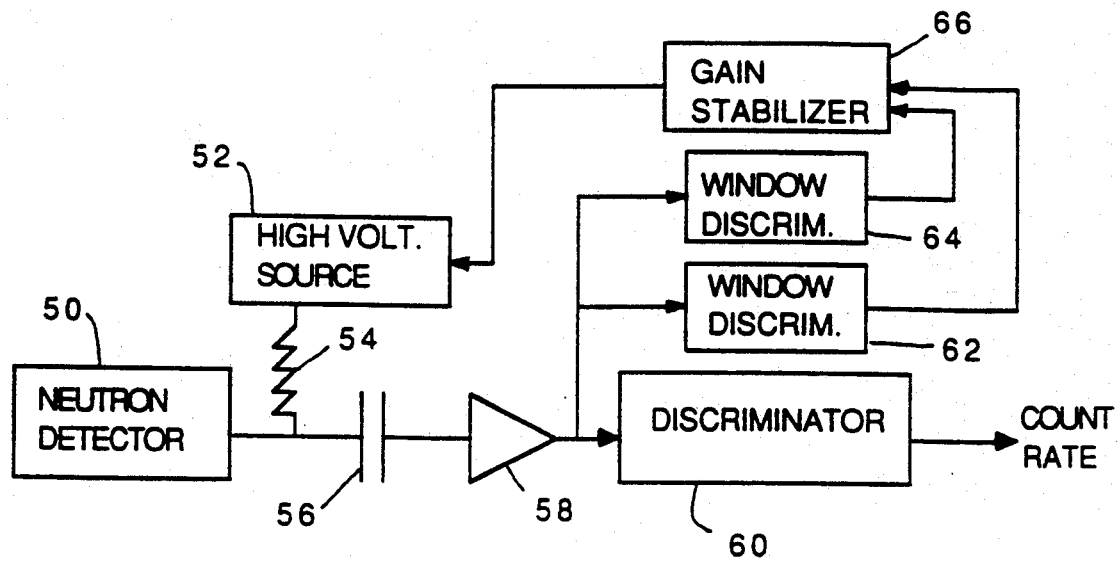
FIG. 4 is a schematic diagram of a neutron detector having a circuit connected in a feedback loop to the detector for stabilizing gain according to this invention.

FIG. 4 is a schematic diagram of a neutron detector 50 having a circuit connected in a feedback loop to the detector for stabilizing gain according to this invention. The neutron detector 50 contains $^3$He gas and is responsive to neutrons occurring in the formation. However, the neutron detector is also responsive to electrons that have been freed by gamma radiation. A high voltage source produces a set voltage level, typically 1-3 KV, that biases a conductor (not shown) within the neutron detector 50. The neutrons and gamma rays produce pulses on the conductor, as described above concerning the apparatus of FIG. 2. A resistor 54 blocks the pulses from reaching the high voltage source 52. A capacitor 56 blocks the voltage of the high voltage source 52 from reaching the amplifier 58. The resistor 54 is on the order of 10 Mohms and the capacitor 56 is on the order of 0.01 microfarads.

The amplifier 58 amplifies the input signal comprising the pulses from the conductor and produces an output signal, as described below concerning FIG. 4. A discriminator 60 sets a predetermined voltage threshold level. The discriminator 60 comprises a voltage comparator or an analog-to-digital converter, for example. Pulses having an amplitude above the threshold level are very likely produced by a neutron and are therefore counted as part of the neutron detector count rate. Pulses having an amplitude below the threshold level are very likely produced by an electron that has been freed by a gamma ray and are therefore not counted as part of the neutron detector count rate.

The circuit also includes two window discriminators 62,64 that receive the output signal of the amplifier 58. Any number of window discriminators is possible. These window discriminators 62,64 each comprise a set of comparators. For each window discriminator, a set of comparators determines two voltage threshold values that define a "window" of interest comprising a pulse height interval. A first window discriminator 62 counts pulses that occur in the first pulse height interval and produces an output signal indicating that count. A second window discriminator counts pulses that occur in the second pulse height interval and produces an output signal indicating that count. All of the discriminators can be powered by the same power supply to track together.

A gain stabilizer circuit 66 receives the two output signals from the two window discriminators 62, 64. The stabilizer 66 basically comprises a counter that receives the output signals from the first window discriminator 62 as a positive count. The stabilizer receives the output signal from the second window discriminator 64 as a negative count.

A processor circuit, such as a digital processor or a microprocessor can replace the gain stabilizer circuit 66 and the two window discriminators 62, 64. The microprocessor can determine any number of windows and look for any ratio of counts within those windows.

Figure 5:
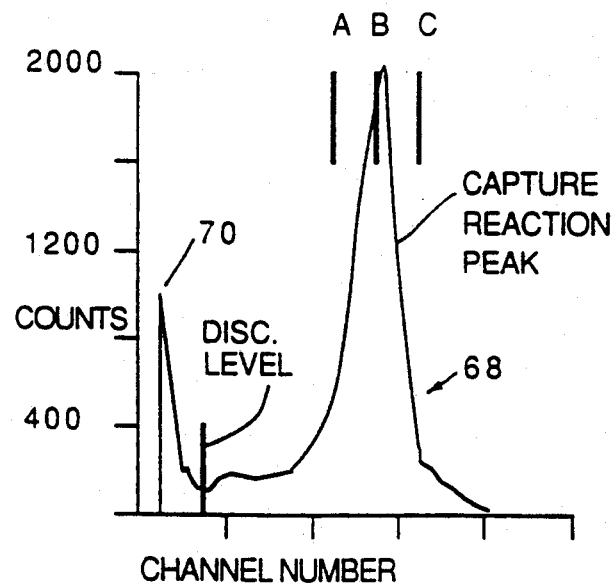
FIG. 5 illustrates a pulse height spectrum of a $^3$He neutron detector and windows that define pulse height intervals according to this invention.

FIG. 5 is a graph that illustrates a pulse height spectrum 68 of a $^3$He neutron detector, which is the output signal of the amplifier 58 of FIG. 4. The number of pulses sensed by the neutron detector 50 are plotted as counts on the abscissa. The amplitude of the pulses sensed by the neutron detector 50 are plotted as channel numbers on the ordinate. The channel numbers are directly proportional to amplitude of the pulses. The large peak of the signal represents those pulses caused by the capture reaction of neutrons. The second peak 70 of the signal represents noise and those pulses caused by electrons that have been freed by gamma radiation.

The energy of detected neutrons is on the order of 1/40 eV for thermal reactions and 1-10 eV for epithermal reactions. These energy levels are much less than the 0.76 Mev of energy that is given to the proton and triton during the capture of a neutron on $^3$He, which the capture reaction peak represents. Because of this great difference, the pulse height spectrum 68 is independent of the environment of the sonde and does not change for neutron energies from 1/40 eV to approximately $10^5$ eV. Thus, the capture reaction peak of the pulse height spectrum 68 occurs at 0.76 MeV, and it is around this expected peak that two pulse height intervals are set. In another embodiment, additional windows could be determined by additional comparator sets. For example, four interval windows could be used to contain the complete pulse height spectrum 68.

The first window discriminator 62 defines a first pulse height interval between two voltage thershold values A and B. Threshold value B substantially coincides with the peak value of the pulse height spectrum 68 and threshold value A is selected as some value less than B. The first window discriminator 62 counts pulses that occur in the pulse height interval defined by the values A and B, and produces an output signal indicating that count. The second window discriminator 64 defines a second pulse height interval between the threshold value B and another threshold value C. Threshold value B again coincides with the peak value of the pulse height spectrum 68 and threshold value C is selected as some value greater than B. Thus, the two window discriminator circuits define two pulse height intervals that are centered relative to the capture reaction peak of the pulse height spectrum 68. The second window discriminator 66 counts pulses the occurs in the pulse height interval defined by the values B and C, and produces an output signal indicating that count. The values A, B and C are determined from lab trials or a computer simulation of the expected pulse height spectrum and the stabilization, which is a function of Poisson statistics for the number of counts and drifts as a function of time. The window discriminators 62, 64 can also comprise analog-to-digital converters having sets of channels that determine the values A, B and C.

For purposes of illustration, the total count occurring in the pulse height interval A-B equals the total count occurring in the pulse height interval B-C, though any ratio is possible. In this case, the output signal of the first window discriminator 62 equals the output signal of the second window discriminator 64. Because these two output signals are equal and are received by the gain stabilizer circuit 66 as positive and negative counts, respectively, the count of the gain stabilizer circuit 66 does not change. Accordingly, the output of the gain stabilizer circuit 66 to the high voltage source 52 does not change and the output voltage of the high voltage source 52 also does not change.

However, as described above, electronic drift causes the pulse height spectrum of FIG. 5 to shift. For example, a load pull-down on the high voltage source would shift the pulse height spectrum to the left as viewed in FIG. 5. In this case, more counts would occur in the first pulse height interval A, B than in the second pulse height interval B, C. The output signal of the first discriminator window would be greater than the output signal of the second discriminator window, and the gain stabilizer circuit would receive more positive counts than negative counts. As the count of the gain stabilizer circuit becomes more positive, the output of the gain stabilizer circuit sends the high voltage source an analog signal that causes the high voltage source to increase the voltage it supplies to the conductor of the neutron detector. This increase in voltage compensates for the electronic drift and causes the pulse height spectrum to shift back to the right until the first and second pulse height intervals again have equal total counts. An opposite shifting of the pulse height spectrum would occur for a voltage surge, for example. In this manner, the voltage of the high voltage source is adjusted to keep the capture reaction peak of the pulse height spectrum 68 at a constant position relative to the discriminator level. In turn, a more accurate neutron count is made.

Open loop neutron detectors typically have a length-to-diameter ratio of greater than three. This ratio insures containment of protons and tritons so that a long plateau occurs in the pulse height spectrum. With the present invention, however, neutron detectors having equal length and diameters, such as 1", are possible. A short plateau occurs in the pulse height spectrum, but this is no problem for the gain stabilized detector of this invention.

Also, with this invention shorter integrating time constants are possible, which provides a higher count rate capability, because only a fraction of the charge is collected from the $^3$He detector. Shorter time constants are accommodated in the amplifier 58 by actively adjusting the high voltage source 52 to hold the discriminator level at the right point on the plateau. Open loop detectors require longer time constants and cannot distinguish between closely spaced neutron events.

A high pressure version of this detector is capable of detecting epithermal events despite the narrow high voltage operating plateau, because this invention compensates for any drifts that might occur in the high voltage.

I claim:

1. An apparatus comprising:
   a $^3$He neutron detector and;
   a circuit means connected in a feedback loop to the $^3$He neutron detector for stabilizing the gain of the $^3$He neutron detector.

2. The apparatus of claim 1, the $^3$He neutron detector producing an output representing a pulse height spectrum according to counts made by the $^3$He neutron detector, the circuit means having a determining means connected to the $^3$He detector for receiving the pulse height spectrum and determining an expected capture reaction peak and a shift of the pulse height spectrum relative to the expected capture reaction peak.

3. The apparatus of claim 2, the circuit means having:
   a voltage source for producing a voltage to the $^3$He detector, and
   an adjusting means connected between the determining means and the voltage source for adjusting the voltage according to the shift of the pulse height spectrum.

4. The apparatus of claim 3, the adjusting means comprising an interval means for defining at least two pulse height intervals within the pulse height spectrum and in which counts made by the $^3$He neutron detector fall, and upon which adjustment of the voltage depends.

5. The apparatus of claim 4, the adjusting means comprising a counting means for receiving information representing the counts in the two pulse height intervals, and connected to the voltage source.

6. The apparatus of claim 5, the interval means comprising two comparator circuits.

7. The apparatus of claim 6, the circuit means having a discriminator circuit connected to receive the output of the $^3$He neutron detector, and comprising a means for setting a threshold voltage level and producing an output signal representing counts having amplitudes above the threshold voltage level.

8. The apparatus of claim 7, the circuit means having an amplifier that receives the output representing a pulse height spectrum from the $^3$He nuclear detector and amplifies that output to the two comparators and the discriminator circuit.

9. The apparatus of claim 8, the counting means comprising a counter circuit having positive and negative inputs, each of the two comparator circuits producing a count signal to a corresponding one of the positive and negative inputs of the counter circuit.

10. The apparatus of claim 3, the adjusting means comprising a processor circuit.

11. An apparatus comprising:
    a $^3$He neutron detector that produces an output representing a pulse height spectrum according to counts made by the $^3$He neutron detector;
    a voltage souce that produces a voltage to the $^3$He neutron detector;
    two comparator circuits that receive the pulse height spectrum, define two pulse height intervals within the pulse height spectrum and in which counts made by the $^3$He neutron detector fall, and produce output signals representing counts in the two pulse height intervals to determine a shift of the pulse height spectrum; and
    a counter circuit that receives the output signals representing the counts in the two pulse height intervals, and connects to the voltage source for adjusting the voltage according to the shift of the pulse height spectrum.

12. The apparatus of claim 11 having a discriminator circuit connected to receive the output of the $^3$He neutron detector, and comprising a means for setting a threshold voltage level and producing an output signal representing counts having amplitudes above the threshold voltage level.

13. The apparatus of claim 12 having an amplifier that receives the output representing a pulse height spectrum from the $^3$He nuclear detector and amplifies that output to the two comparator circuits and the discriminator circuit.

14. The apparatus of claim 13, the counter circuit having positive and negative inputs connected such that each of the two comparator circuits produce a count signal to a corresponding one of the positive and negative inputs of the counter circuit.

15. The apparatus of claim 14, the pulse height spectrum having a capture reaction peak, and the two comparator circuits defining two pulse height intervals that are centered relative to the capture reaction peak.

16. An apparatus comprising:
a $^3$He neutron detector that produces an output representing a pulse height spectrum according to counts made by the $^3$He neutron detector;
a stabilizing circuit for stabilizing the gain of the apparatus connected in a feedback loop to the $^3$He neutron detector, the stabilizing circuit comprising:
a means for receiving the pulse height spectrum, determining at least two pulse height intervals within the pulse height spectrum, receiving information representing counts occurring in the two pulse height intervals and producing a signal indicating a shift of the pulse height spectrum relative to the pulse height intervals; and
a voltage source that receives the signal of the stabilizing circuit and produces a voltage to the $^3$He neutron detector according to the shift of the pulse height spectrum.

17. The apparatus of claim 16, the stabilizing circuit having two window discriminator circuits and a counting circuit, the counting circuit having positive and negative inputs, each of the two window discriminator circuits producing a count signal to a corresponding one of the positive and negative inputs of the counting circuit.

18. The apparatus of claim 17, the stabilizing circuit including an amplitude discriminator circuit connected to receive the output of the $^3$He neutron detector, and comprising a means for setting a threshold voltage level and producing an output signal representing counts having amplitudes above the threshold voltage level.

* * * * *